April 28, 1931. M. J. DORNER ET AL 1,802,411
SHOCK ABSORBER
Filed Aug. 28, 1928  2 Sheets-Sheet 1
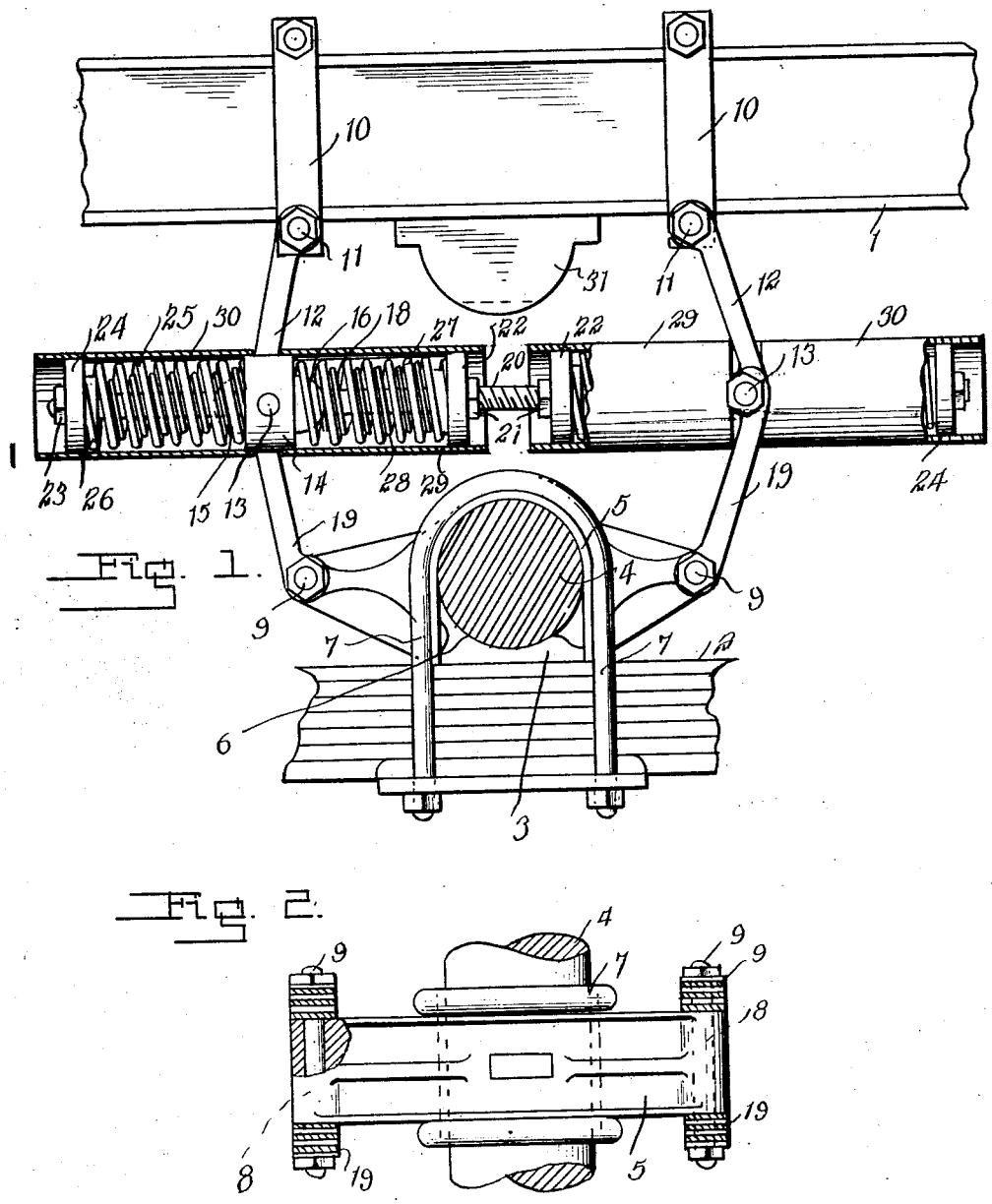
INVENTOR.
M.J.Dorner
F.F.Merville
BY
Lacey & Lacey, ATTORNEYS

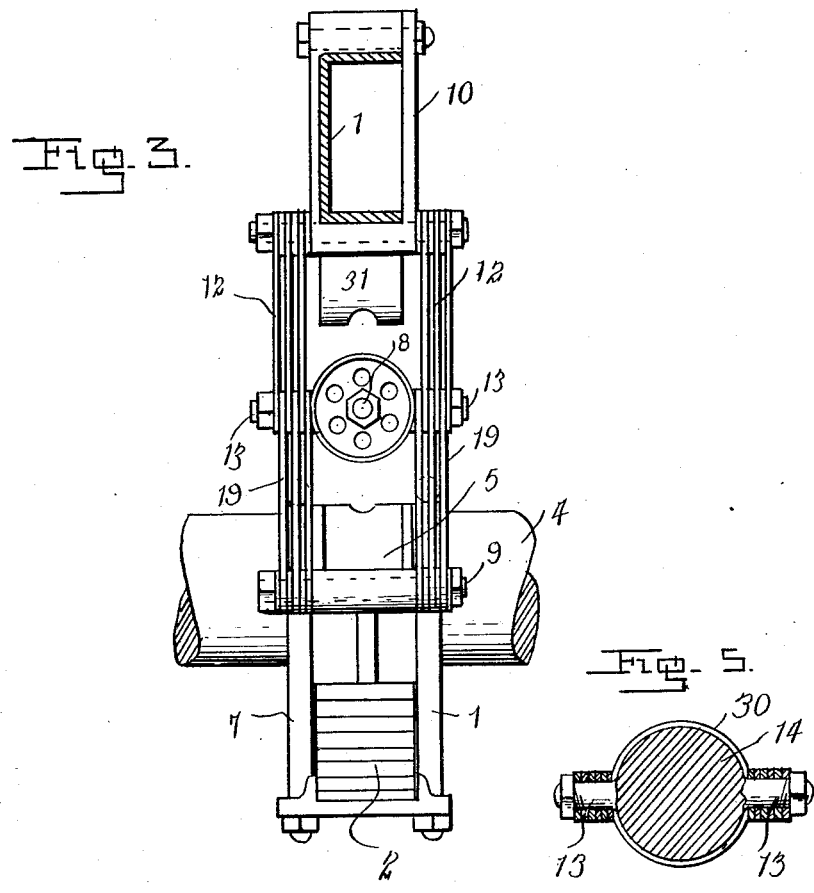
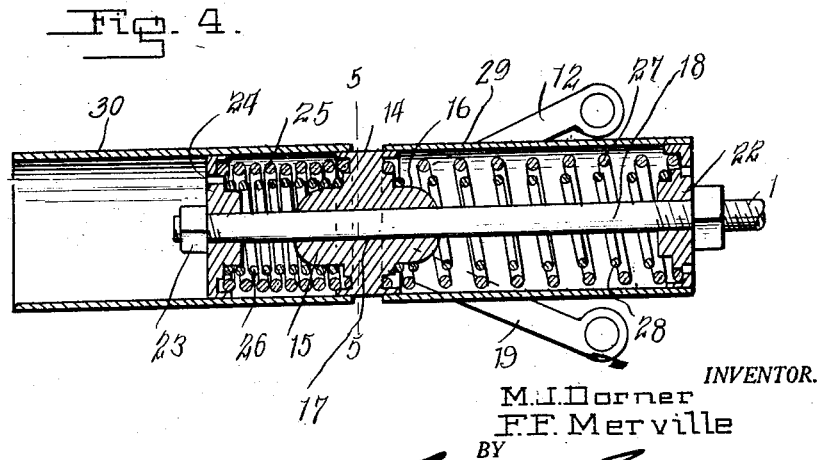

Patented Apr. 28, 1931

1,802,411

UNITED STATES PATENT OFFICE

MICHAEL J. DORNER AND FRANK F. MERVILLE, OF BINGHAMTON, NEW YORK

SHOCK ABSORBER

Application filed August 28, 1928. Serial No. 302,602.

The present invention is directed to improvements in shock absorbers.

The primary object of the invention is to provide novel, simple and efficient shock absorber particularly designed for use in connection with motor vehicles, the construction being such that all shocks incident to a vehicle traveling over road obstructions will be absorbed.

Another object of the invention is to provide a device of this character including toggle links for disposition between the frame and spring of the vehicle, the movement of the toggle links being yieldably resisted as the frame and spring move toward or away from each other.

Another object of the invention is to provide a shock absorber so constructed that it can easily and quickly be attached to or removed from the vehicle.

With these and other objects in view, this invention resides in the novel features of construction, formation, combination and arrangement of parts to be hereinafter more fully described, claimed and illustrated in the accompanying drawings, in which:—

Figure 1 is a side elevation showing the device in place upon the vehicle, and with some parts in section.

Figure 2 is a detail sectional view.

Figure 3 is an end view.

Figure 4 is an enlarged detail sectional view through one of the units.

Figure 5 is a sectional view on line 5—5 of Figure 4.

Referring to the drawings, 1 and 2, designate, respectively, portions of the vehicle frame and spring. The spring has mounted thereon a bearing block 3 and upon which is seated the axle 4.

A saddle 5 is provided and has a recess 6 formed in its under surface for receiving the axle, said saddle being firmly connected to the spring by a pair of U-bolts 7. The saddle has its ends provided with bearings 8 in which are engaged the bolts 9, the purpose of which will be later explained.

A pair of clamps 10 are bolted to the frame 1 and have carried thereby bolts 11 to the ends of which are pivotally connected the upper ends of the toggle links 12, the lower ends of which are pivotally connected to the trunnions 13. These trunnions 13 are carried by the heads 14 and extend from the opposite sides thereof. The opposite ends of the heads are provided with bosses 15 and 16, said bosses and heads having axial bores 17 for slidably receiving the rod 18.

Toggle links 19 are provided and have their upper ends pivotally connected to the trunnions 13, while the lower ends thereof are similarly connected to the bolts 9 carried by the ends of the saddle 5.

The rod 18 is slidable in the bores 17 of both heads 14 and is threaded intermediate its ends, as at 20. Engaged on the threaded portion of the rod are jam-nuts 21—21 which bear against the disks 22—22. The disks 22—22 are threaded upon the rod 18 and are held in their adjusted position by the jam-nuts 21—21.

The other ends of the rod are threaded for receiving the nuts 23, said nuts bearing against the disks 24 slidably adjustable on said rod.

Interposed between the disks 24 and heads 14 are concentrically arranged coil springs 25 and 26, there being similarly arranged springs 27 and 28 interposed between said heads and the disks 22, the bosses obviously serving to center the opposed ends of the respective springs.

It will be of course apparent that the tension of the respective springs can be conveniently regulated upon adjusting the disks 22 and 24.

In order to protect the springs from dirt and grit each head 14 has secured thereto the opposed ends of the casings 29 and 30 which are capable of sliding with said heads.

A rubber buffer 31 is suitably fixed to the frame 1 and is so arranged that it can strike the saddle 5 when the frame moves downwardly to an abnormal degree.

As shown in Figure 1 of the drawings, the device is in its neutral position but when the spring 2 and frame 1 approach each other the links 12 and 19 will assume the position as shown in Figure 4 and at this time the heads 14 have moved outwardly upon the rod, thus compressing the springs 25 and 26. Upon rebound of the frame 1 the heads will slide in reverse directions, thus compressing the springs 27 and 28 and permitting the springs 25 and 26 to expand.

From the foregoing, it is thought that the construction, operation and many advantages of the herein desscribed invention will be apparent to those skilled in the art, without further description, and it will be understood that various changes in the size, shape, and proportion and minor details of construction, may be resorted to without departing from the spirit of sacrificing any of the advantages of the invention.

What is claimed is:—

1. A shock absorber including means adapted to be secured to opposed relatively movable parts, a rod having screw threads substantially midway between the ends and being also threaded at the ends, a head slidable on the rod between each terminal and the central threaded portion thereof, levers connecting said heads with said means and forming toggles, end discs threaded on the ends of said rod, and center discs threaded on the threaded central portion of said rod, coil springs held under tension on said rod against opposite sides of each head and abutting the corresponding end disc and central disc, adjustment of said central discs varying the tension of said springs, and nuts on the threaded central portion of said rod for locking the central discs in adjusted position.

2. A shock absorber including means adapted to be secured to opposed relatively movable parts, a rod, spaced heads sliding on the rod, levers securing said heads to said means and forming toggles, each head having trunnions, a casing receiving the trunnions of and housing each head and extending from the end to nearly the center of said rod, and discs and central discs threaded on said rod and closing the open ends of the corresponding casing, coil springs housed by said casings and held under tension on said rod against opposite sides of each head and abutting the corresponding end disc and central disc, adjustment of said central discs towards and away from each other within the opposed ends of said casings varying the tension of said springs and means for locking said central discs in adjusted positions.

In testimony whereof we affix our signatures.

MICHAEL J. DORNER. [L. S.]
FRANK F. MERVILLE. [L. S.]